No. 864,729. PATENTED AUG. 27, 1907.
L. GARM.
MEAT HOLDER.
APPLICATION FILED APR. 9, 1907.
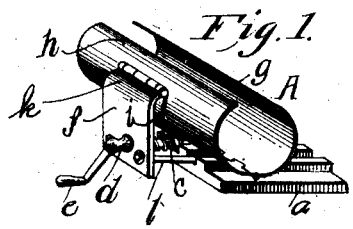
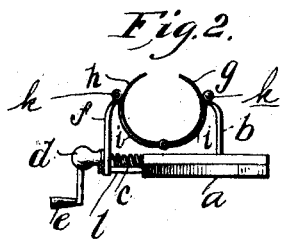
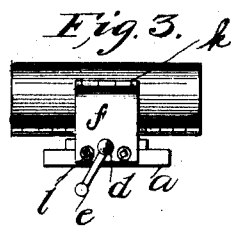
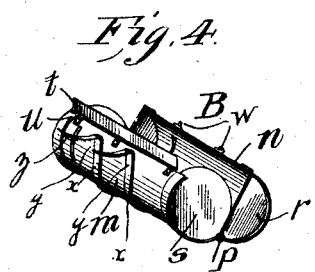
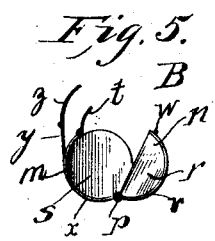
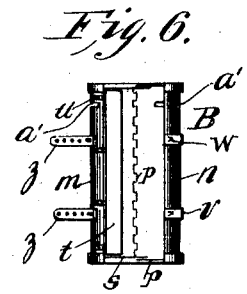
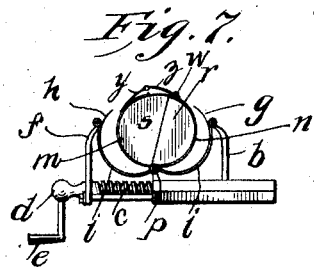
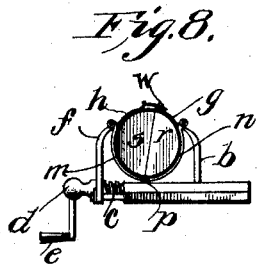
WITNESSES:
D. E. Wilson
J. J. Sheehy Jr.
INVENTOR
Louis Garm.
BY
James Sheehy
Attorney
THE NORRIS PETERS CO., WASHINGTON, D. C.

UNITED STATES PATENT OFFICE.

LOUIS GARM, OF REDCLIFF, COLORADO.

MEAT-HOLDER.

No. 864,729.  Specification of Letters Patent.  Patented Aug. 27, 1907.

Application filed April 9, 1907. Serial No. 367,197.

*To all whom it may concern:*

Be it known that I, LOUIS GARM, a citizen of the United States, residing at Redcliff, in the county of Eagle and State of Colorado, have invented new and useful Improvements in Meat-Holders, of which the following is a specification.

My invention pertains to meat holders; and it contemplates the provision of a meat holder embodying such a construction that a ham after being boiled in the holder is given a perfectly smooth and presentable exterior and is much more inviting than when wrapped with twine and is consequently more marketable. This will be better appreciated when it is noted that a ham wrapped with twine and boiled in the ordinary manner is always cracked or split to a greater or less extent on the surface subsequent to boiling, and consequently it affords lodgment for dust and dirt in packing, shipping and handling with the result that when the ham reaches the consumer it is in an unpresentable state and therefore does not command a price commensurate with its real value.

The meat holder is designed to form part of an apparatus comprising a pressure-exerting member, and for the sake of clearness I will describe the apparatus as a whole.

In the drawings accompanying and forming part of this specification Figure 1 is a perspective view of the pressure-exerting member of the apparatus. Fig. 2 is an end elevation of said member. Fig. 3 is a side elevation of the same. Fig. 4 is a perspective view illustrating the meat-holding member of the apparatus as open. Fig. 5 is an end elevation of said meat-holding member. Fig. 6 is a plan view of the same. Fig. 7 is an end elevation illustrating the pressure-exerting member as open and the meat-holding member properly positioned therein. Fig. 8 is a similar view showing the pressure-exerting member of the apparatus closed.

Similar letters designate corresponding parts in all of the views of the drawings, referring to which:

A. is the pressure-exerting member of the apparatus, the said member being shown separately in Figs. 1, 2 and 3, and B is the meat-holding member of the apparatus which is shown separately in Figs. 4, 5 and 6.

The pressure-exerting member A is made up of a base $a$, a fixed standard $b$ rising therefrom, a screw $c$ bearing in a nut or the like (not shown) fixed with respect to the base $a$ and having a head $d$ at its outer end and a crank $e$ thereon, a movable standard $f$ in which the screw is journaled and which is movable rectilinearly with the screw, clamping jaws $g$ and $h$, of semi-circular form as shown or any other suitable form in cross-section, and reinforcements $i$ hinged at $k$ to the standards $b$ and $f$. The jaws $g$ and $h$ are hinged together at the bottom, and the reinforcements $i$ are also hinged together at the bottom as best shown in Figs. 2 and 7.

In addition to the elements mentioned the pressure-exerting member A comprises guide rods $l$ which are fixed to the movable standard $f$ and are movable in guide apertures through the base $a$, and have for their office to lend strength and regularity of motion to the standard $f$.

It will be apparent from the foregoing that when the crank $e$ is turned in one direction, the moving parts of the member A will be moved from the position shown in Fig. 2 to the positions shown in Fig. 7, while when said crank is turned in the opposite direction the moving parts will be moved from the positions shown in Fig. 7 to those shown in Fig. 2.

The meat holder or meat-holding member B of the apparatus comprises two body sections $m$ and $n$, preferably of semi-circular form in cross-section, hinged together along their lower longitudinal edges as indicated by $p$, semi-circular heads $r$ fixed to and carried by the section $n$, circular heads $s$ fixed to and carried by the section $m$ and movable at the inner sides of the heads $r$ with a view of preventing leakage of meat from the ends of the holding member, a tongue $t$ hinged at $u$ to the free edge of the body member $m$ and designed after the member B is filled with meat to be pressed down so as to enter the section $n$ and thereby prevent leakage of meat from the top of the holding member when said member is subjected to pressure, bands $v$ fixed to the outer side of the body section $n$ and having studs $w$ at points adjacent to the free edge of said section, bands $x$ fixed to the outer side of the body section $m$ and hinged to the bands $v$ and having free end portions $y$, best shown in Fig. 5, and hasps $z$ hinged to the ends of the band portions $y$ and curved in the direction of their length and having apertures at intervals in their length, Fig. 6, for a purpose presently set forth. The free portions $y$ of the bands $x$ are designed when the holding member B is closed and the hasps $z$ are placed in engagement with the studs $w$, to be put under tension so as to allow some expansion and at the same time draw the free edges of the body sections $m$ and $n$ tightly together. In their sides the members $m$ and $n$ are provided with slots or other suitable apertures $a'$, Figs. 4 and 6, through which the contents of the holding member B may be tested during the cooking thereof.

In the practical use of my apparatus, the holding member B is filled with meat, and is closed to as great an extent as possible by hand; the tongue $t$ being positioned to enter under the free edge of the body section $n$ so as to serve the purpose hereinbefore ascribed to said tongue. After the member B is filled with meat and closed by hand as stated, the member B is placed between the jaws of the pressure-exerting member A, after the manner shown in Fig. 7, and the screw $c$ is turned to press the member B between the jaws and to the extent desired, and the hasps $z$ are placed in engagement with the studs $w$. With this done, the member A is opened, and the meat-holding member B is removed from said member A and is placed in a steamer or boiler to cook the meat, and subsequent to the said cooking the member B is removed and permitted to stand until the meat is cool, and then is opened by disengaging the hasps from their complementary studs, when, as will be readily apparent, the meat may be removed with facility from the holding member. It will also be apparent that when the meat is removed as stated it is in the form of a compact cylindrical body having a smooth and attractive exterior, and that in the use of the meat there is no waste inasmuch as the first slice taken therefrom is full size and smooth. The advantage of this will be appreciated when it is remembered that when a ham is cooked in the ordinary way the end of the ham that is usually cut is jagged and a portion has to be cut off and wasted before slices are taken from the ham for consumption.

I have entered into a detailed description of the construction and relative arrangement of the parts comprised in the present and preferred embodiment of my invention in order to impart a definite understanding of said embodiment. I do not desire, however, to be understood as confining myself to the said specific construction and relative arrangement of parts as it is obvious that in practice such changes or modifications may be made as fairly fall within the scope of my invention as defined in the claims appended.

Having described my invention, what I claim and desire to secure by Letters-Patent, is:

1. A meat holder for the purpose described, comprising body sections of semi-circular form in cross-section hinged together along two of their longitudinal edges; one of the said body sections having semi-circular heads at its ends, and the other having circular heads at its ends lapped with the heads of the first mentioned section, a tongue hinged to the free edge of one body section and arranged to be positioned within the free edge of the other body section, and means for detachably fastening the body sections in their closed positions.

2. A meat holder for the purpose described, comprising body sections of semi-circular form in cross-section hinged together along two of their longitudinal edges; one of the said body sections having semi-circular heads at its ends, and the other having circular heads at its ends lapped with the heads of the first mentioned section, a tongue hinged to the free edge of one body section and arranged to be positioned within the free edge of the other body section, bands connected to the outer side of one body section and having portions that are free from said body section, hasps hinged to said free portions of the band, and means on the other body section for coöperating with the hasps in detachably fastening the body sections in their closed positions.

In testimony whereof I have hereunto set my hand in presence of two subscribing witnesses.

LOUIS GARM.

Witnesses:
   GEO. E. BOWLAND,
   STEWART COLLINS.